F. SCHNEIDER.
GEARING.
APPLICATION FILED AUG. 12, 1911.
1,104,736.
Patented July 21, 1914.
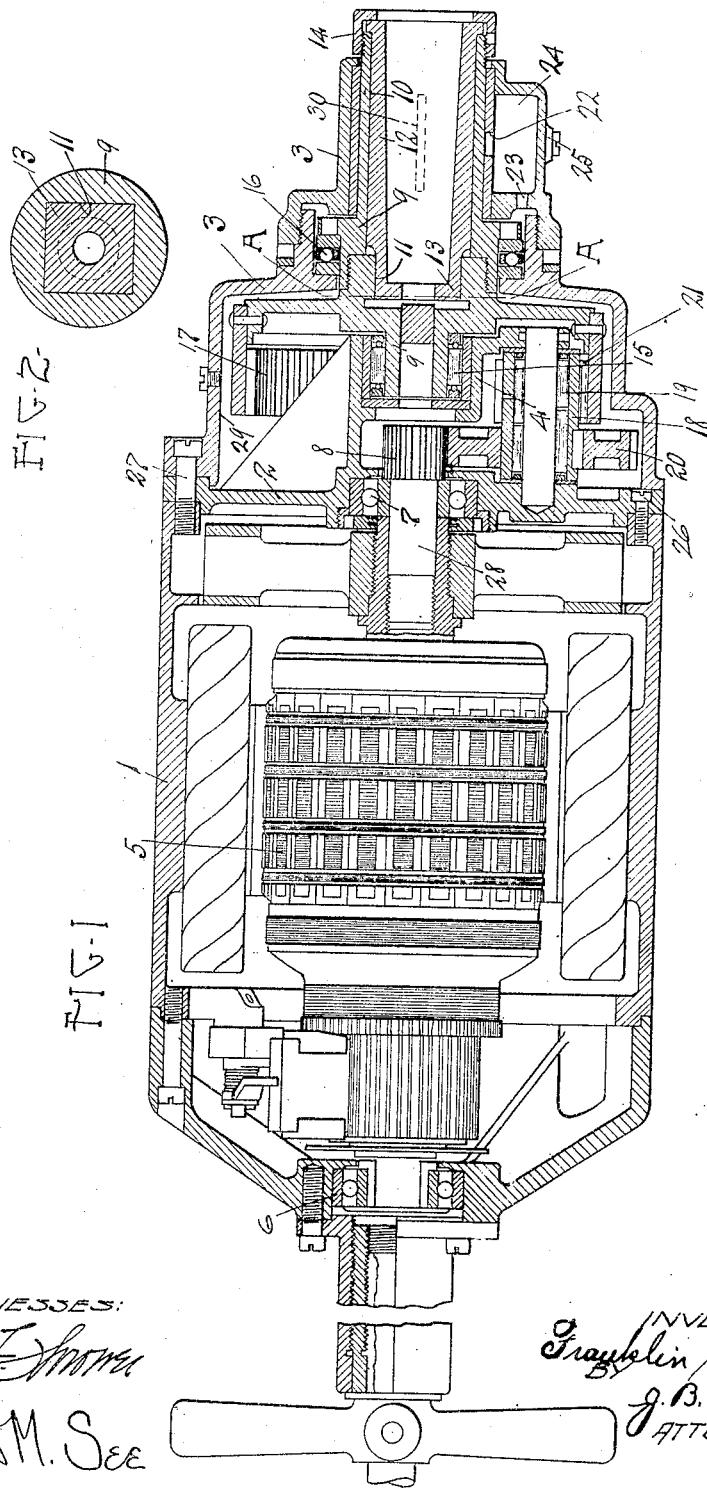
WITNESSES:
Robert M. See
INVENTOR
Franklin Schneider
BY J. B. Fay
ATTORNEY

UNITED STATES PATENT OFFICE.

FRANKLIN SCHNEIDER, OF CLEVELAND, OHIO, ASSIGNOR, BY MESNE ASSIGNMENTS, TO THE VAN DORN ELECTRIC TOOL COMPANY, OF CLEVELAND, OHIO, A CORPORATION OF OHIO.

GEARING.

1,104,736.   Specification of Letters Patent.   Patented July 21, 1914.

Application filed August 12, 1911. Serial No. 643,796.

*To all whom it may concern:*

Be it known that I, FRANKLIN SCHNEIDER, a citizen of the United States, and a resident of Cleveland, county of Cuyahoga, and State of Ohio, have invented a new and useful Improvement in Gearing, of which the following is a specification, the principle of the invention being herein explained and the best mode in which I have contemplated applying that principle, so as to distinguish it from other inventions.

The present invention relates to gearing, and it has as a particular object the provision of an electrically operated tool in which the operative parts may be easily and compactly assembled, and in which the power will be transmitted from the motor to the tool evenly and with a minimum of strain on the mechanism.

The annexed drawing and the following description set forth in detail certain mechanism embodying the invention, such disclosed means constituting, however, but one of various mechanical forms in which the principle of the invention may be used.

In said annexed drawing:—Figure 1 is a cross section of a tool embodying my invention, and Fig. 2 is a section on the line A—A in Fig. 1.

The casing which houses the operative parts of the tool may be of any form but is preferably cylindrical as shown in the drawing. In the present instance the casing comprises a cylindrical portion 1 closed at one end by a head and at the other end by a partition 2, and beyond this partition is a stepped extension of the casing 3. The partition 2 is, furthermore, provided on its outer face with a cylindrical projection 4, this projection lying in a compartment 29 formed by the partition 2 and a portion of the stepped extension 3.

A motor 5 is mounted in the casing between the head and the partition 2 and is provided in the head with an anti-friction bearing 6 and in the partition with an anti-friction bearing 7, the partition being imperforate except for the opening through which extends the spindle 28 of the motor.

On the outer end of the spindle 28 within the compartment 29 is secured a pinion 8.

A rotatable sleeve 9 is journaled in the projection 4 of the partition 2 and in the outer end of the stepped extension 3 of the casing. This sleeve at its outer end is formed or provided with a cylindrical bore 10 which is provided at its inner end with a polygonal recess 11. Seated in the bore 10 is a cylindrical member 12 which has at its inner end a polygonal boss 13 fitting in the recess 11, the member 12 being designed to suitably hold the tool. A flanged nut 14 is threaded on the sleeve 9 and serves to retain the member 12 in place. A lateral anti-friction bearing 15 is provided for the inner end of sleeve 9 in the projection 4 of the partition 2 while intermediate its ends the sleeve is provided with an anti-friction thrust bearing 16.

Secured to the inner end of the sleeve 9 within the compartment 29 is an internal annular gear 17, the axis of the sleeve 9 and of the gear 17 being directly in line with the axis of the motor spindle 28.

Journaled at their respective ends in partition 2 and in the extension 4 therefrom, and parallel with the motor spindle 28 and the alined work-spindle, (sleeve 9 and member 12 together forming what I will term a work spindle) are one or more shafts 18 mounted in anti-friction bearings 19. A gear 20 is secured to shaft 18 and meshes with the pinion 8, while a second gear 21 secured to the shaft 18 meshes with the internal gear 17.

It will be obvious that the mechanism herein described may be readily assembled. After the motor is placed in its casing the partition 2 is secured to the part 1 of the casing by screws 26, the shaft 18 with its gears being inserted immediately thereafter. The sleeve 9 may be then readily put in place including the gear 17, after which the portion 3 of the casing is secured to the partition 2 and portion 1 by screws 27.

After the parts are assembled, it will be seen that the axis of rotation of the motor spindle 28, the annular driving gear 17 and the work spindle are all in direct alinement, moreover, the cylindrical member 12, which, as tool-receiving socket forms part of such work-spindle, connected at its inner end, or base to the hub of such gear 17 thus eliminating much of twisting strain that occurs in prevailing construction.

As the partition 2 and the integral cylindrical projection 4 from such partition provide not only a self-contained support for the shaft 18 with its gears, but also the main bearing for internal gear 17, it will be seen that such latter gear and the pinion 19 on shaft 18 cannot be readily thrown out of proper alinement no matter to how severe a strain they may be subjected. This construction has been found in practice to give unusually satisfactory results, whereas heretofore the portion of the mechanism in question has always been a weak point.

The end-thrust on the work-spindle being taken up by the bearing 16, which is large enough to be amply adequate for the purpose, the bearing 15, is relieved of all but lateral strain and this, especially where a plurality of spindles 18 are employed, as the thrust of the latter on the gear 17 will then be more or less equalized.

For the purpose of lubrication, the chamber or compartment 29 is closed at its outer, as well as its inner end, the hub of gear 17 being plugged or otherwise made imperforate with this in view. Such compartment is then designed to be packed with a semi-fluid grease in which the gears that connect the motor and work spindles may freely churn about and thus insure the thorough lubrication of every working part. The foregoing will serve also to lubricate the bearings 7 provided for the inner end of the motor-spindle. For the outer end of the work-spindle, however, a pocket or chamber 24 is provided in the casing 3, from which one port 22 leads through the bushing that surrounds sleeve 9 directly to the bearing of such sleeve; while a second port 23 communicates directly with the end-thrust bearing 16. A more fluid oil, such as machine oil, is preferably supplied to the pocket 24 for the bearings last referred to. The thorough distribution of the oil passing through port 22 is insured by providing one or more longitudinally extending felt pads 30 in corresponding recesses in the bearing of sleeve 9.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a casing; a motor mounted therein and provided with a spindle; a pinion secured on said spindle; a first gear meshing with said pinion; a second gear rotatable with said first gear; a tool-spindle alined with said motor-spindle; an anti-friction bearing for said tool-spindle adjacent its inner end; a thrust-bearing for said tool-spindle disposed between its ends; and an internal gear secured to said tool spindle between the anti-friction bearing and thrust bearing and in mesh with the second gear.

2. In mechanism of the character described, the combination of a casing; a motor mounted therein and provided with a spindle; a pinion secured on said spindle; a tool-spindle alined with said motor-spindle; an anti-friction bearing for said tool-spindle adjacent its inner end; a thrust - bearing for said tool - spindle disposed between its ends; an internal gear secured to said tool - spindle between the anti-friction bearing and the thrust bearing; a rotatable shaft parallel with said motor-spindle and tool-spindle; and two gears secured to said shaft, one of said gears meshing with said pinion and the other meshing with said internal gear.

3. In mechanism of the character described the combination of a casing; a motor mounted in said casing; a partition near one end of the latter, the motor-spindle projecting through said partition and the latter being provided on its outer face with an extension; a tool-spindle journaled in the end of said casing and in said extension; an internal gear attached to the inner end of said tool-spindle; a rotatable shaft parallel with said motor-spindle and journaled at one end in said partition and at the other in such extension; and pinions on said shaft connecting the same with said motor spindle and with said internal gear, respectively.

4. In mechanism of the character described, the combination of a casing; a partition near one end of the latter; a motor mounted in said casing, the motor spindle projecting through said partition; a tool spindle journaled in the end of said casing and in said partition; and gearing disposed between the outer face of the partition and the adjacent end of the casing, and connecting the motor spindle with the tool spindle.

Signed by me this 9th day of Aug., 1911.
FRANKLIN SCHNEIDER.
Attested by—
Myrtle K. Schuch.
Jno. F. Oberlin.